(12) United States Patent
Hider et al.

(10) Patent No.: US 9,654,936 B2
(45) Date of Patent: May 16, 2017

(54) METHOD AND APPARATUS FOR NORMALIZING NAVIGATION DATA FOR VEHICLE COMPUTING SYSTEM PLAYBACK

(75) Inventors: Mounir Hider, Dearborn, MI (US); David Marvin Gersabeck, Commerce Township, MI (US); Edward Andrew Pleet, Livonia, MI (US); Yiping Xia, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 888 days.

(21) Appl. No.: 13/547,223

(22) Filed: Jul. 12, 2012

(65) Prior Publication Data

US 2014/0019040 A1    Jan. 16, 2014

(51) Int. Cl.
H04W 4/04 (2009.01)
G01C 21/36 (2006.01)

(52) U.S. Cl.
CPC ........ H04W 4/046 (2013.01); G01C 21/3661 (2013.01)

(58) Field of Classification Search
CPC .......................... H04W 4/046; G01C 21/3661
USPC ........................................................ 701/428
See application file for complete search history.

(56) References Cited

U.S. PATENT DOCUMENTS

2006/0161312 A1\* 7/2006 Juengling et al. ................. 701/1
2008/0102854 A1\* 5/2008 Yi et al. ...................... 455/456.1
2010/0138149 A1\* 6/2010 Ohta et al. ..................... 701/201

OTHER PUBLICATIONS

Ford Motor Company, "SYNC with Navigation System," Owner's Guide Supplement, SYNC System Version 1 (Jul. 2007).
Ford Motor Company, "SYNC," Owners's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem," Automotive Design & Production, Oct. 2003, http://findarticles.com, pp. 103.

\* cited by examiner

*Primary Examiner* — Michael D Lang
(74) *Attorney, Agent, or Firm* — Jennifer M. Stec; Brooks Kushman P.C.

(57) ABSTRACT

A system includes a processor configured to communicate wirelessly with a mobile device, wherein the processor is further configured to receive output data from a navigation application running on the mobile device. The processor is also configured to send data back through the mobile device to a standardization system, including a request for standardization, running on a remote system, if the output data is in an unusable format. Also, the processor is configured to receive a standardized form of the data, having been standardized by the remote standardization system. The processor is further configured to process the standardized data to provide navigation directions through one or more vehicle outputs controllable by the processor.

20 Claims, 4 Drawing Sheets

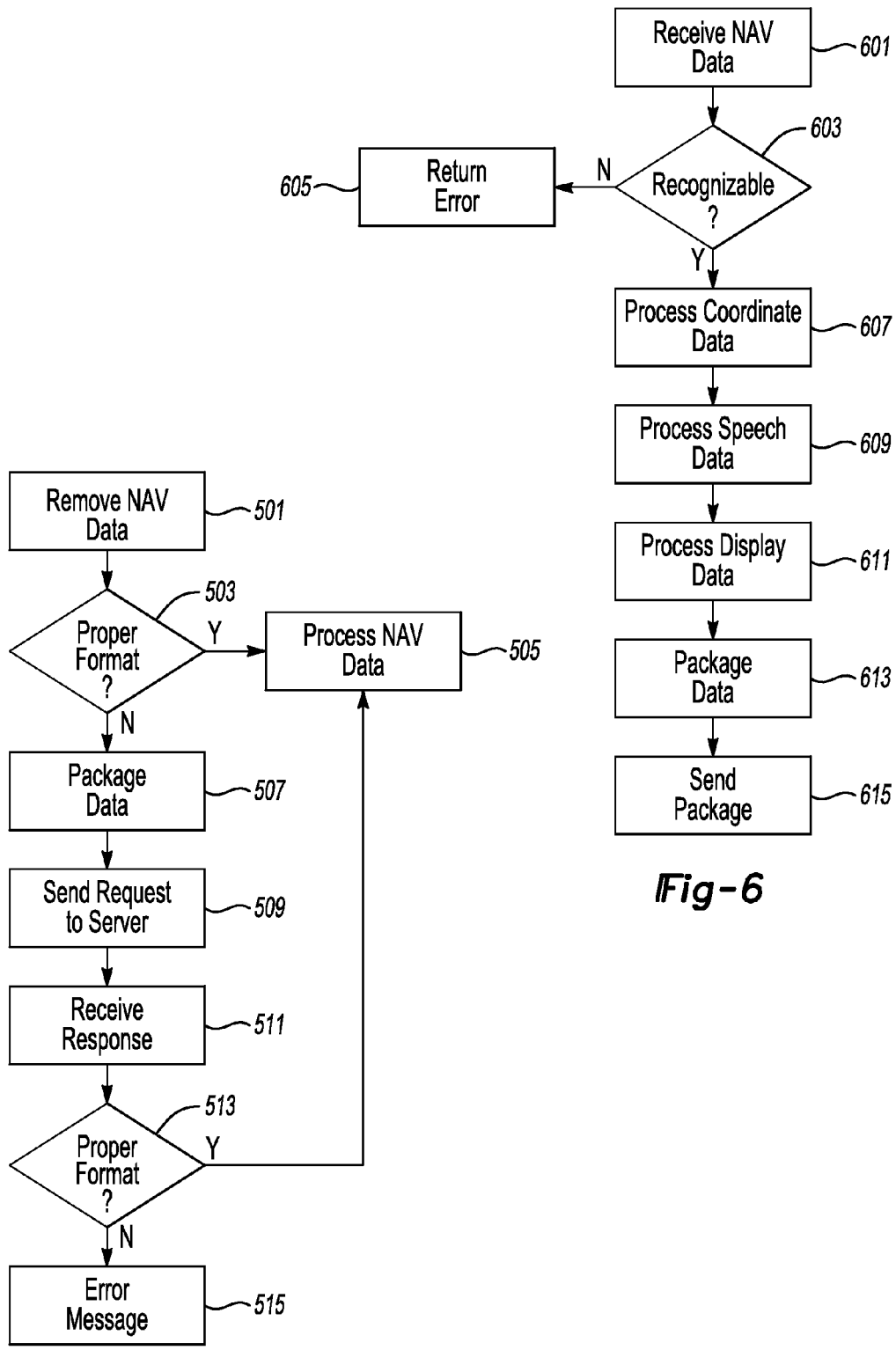

METHOD AND APPARATUS FOR NORMALIZING NAVIGATION DATA FOR VEHICLE COMPUTING SYSTEM PLAYBACK

TECHNICAL FIELD

The illustrative embodiments generally relate to a method and apparatus for normalizing navigation data for vehicle computing system playback.

BACKGROUND

Vehicle computing systems, such as the FORD SYNC system, have been provided with increasing capability to provide applications and unique features to vehicle drivers and occupants. For example, even predating SYNC, vehicles have been outfitted with the capability to provide navigation directions to users.

Typically, for a vehicle to provide on-board navigation, the vehicle is equipped with a GPS device, which provides a current location of the vehicle, and some form of processor and output for handling the direction processing and direction display.

At the same time, many modern wireless devices, such as smart phones, now come equipped with GPS features as well. These devices often have direction provision capability, and can be used to determine directions to a destination.

If the output from these smart phone navigation applications could be utilized by a vehicle computing system, the vehicle OEM could forego the installation of a GPS module in the vehicle itself. Unfortunately, there is little in the way of standardization for the developers of smart phone navigation applications, due to both the lack of mandated standardizations and variance between developers. Often times, the developer can even be a sole individual working to make an application to be sold to users of the mobile device.

SUMMARY

In a first illustrative embodiment, a system includes a processor configured to communicate wirelessly with a mobile device, wherein the processor is further configured to receive output data from a navigation application running on the mobile device. The processor is also configured to send data back through the mobile device to a standardization system, including a request for standardization, running on a remote system, if the output data is in an unusable format. Also, the processor is configured to receive a standardized form of the data, having been standardized by the remote standardization system. The processor is further configured to process the standardized data to provide navigation directions through one or more vehicle outputs controllable by the processor.

In a second illustrative embodiment, a system includes a mobile device, in communication with a processor and configured to run a plurality of applications. Running of a data handling application results in the mobile device being configured to receive output data from a navigation application, also running on the mobile device. The mobile device is also configured to determine if the output data is in a usable format and send usable data to a vehicle computing system in wireless communication with the mobile device, including a request for the vehicle to output the usable data in the form of navigation instructions. Also, the mobile device is configured to standardize unusable data if the data is standardizable by a local process executable by the mobile device. The mobile device is further configured to send data that is unusable and not locally standardizable to a remote server for standardization.

Additionally, the mobile device is configured to receive data, having been standardized by the remote server and relay the standardized data to the vehicle computing system, including a request for the vehicle to output the usable data in the form of navigation instructions.

In a third illustrative embodiment, a system includes a processor configured to wirelessly communicate with a mobile device, wherein the processor is further configured to receive incoming navigation data from an application running on the mobile device. The processor is also configured to send the data back through the mobile device to a remote server including a request for data standardization and receive the data, having been standardized by the server as per the request. The processor is further configured to process the reconfigured data to provide navigation instructions to a driver.

BRIEF DESCRIPTION OF THE DRAWINGS

FIG. 5 shows an illustrative example of a third navigation data handling process; and FIG. 6 shows an illustrative example of yet another navigation data handling process.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
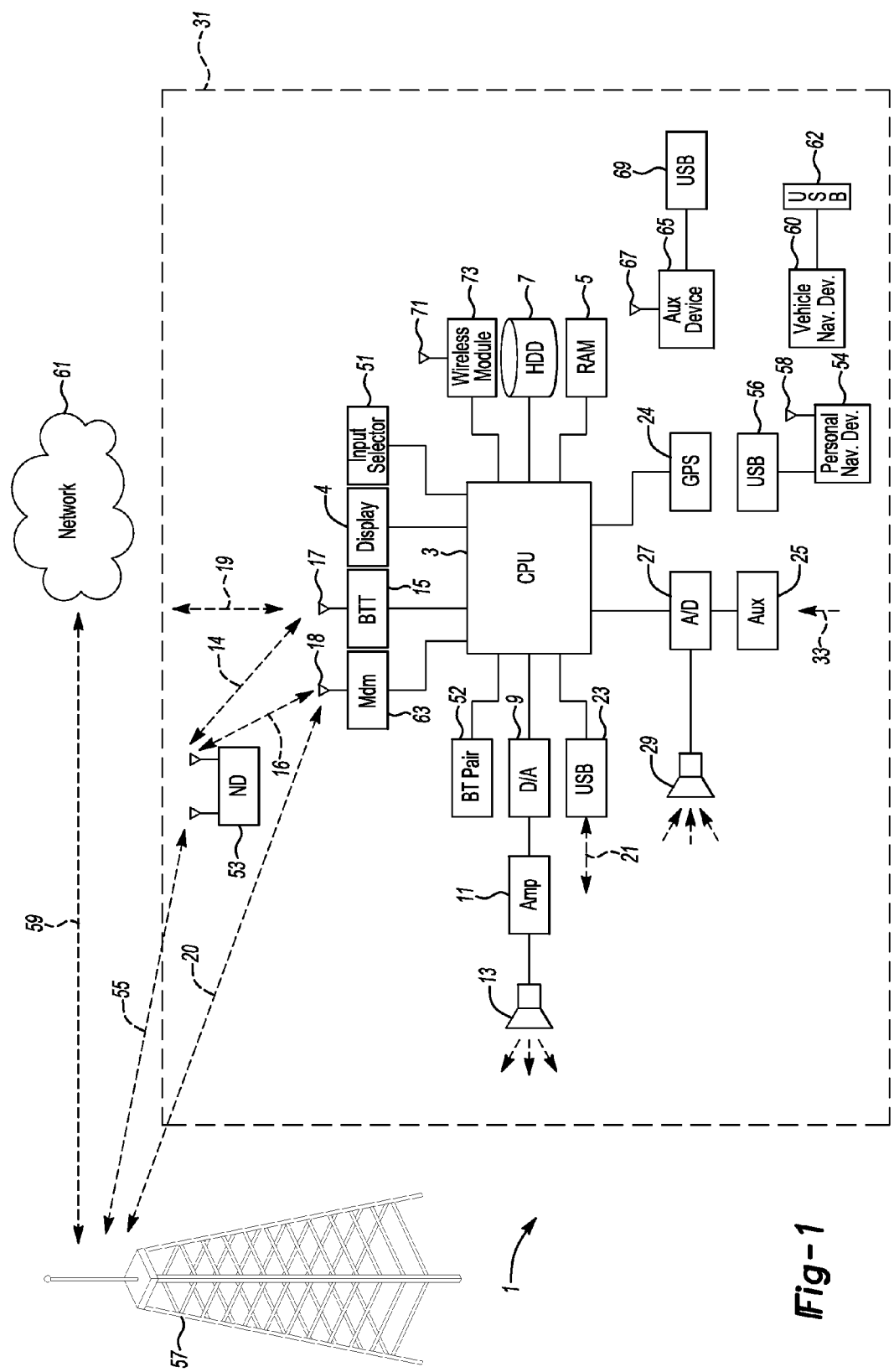
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device.

Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
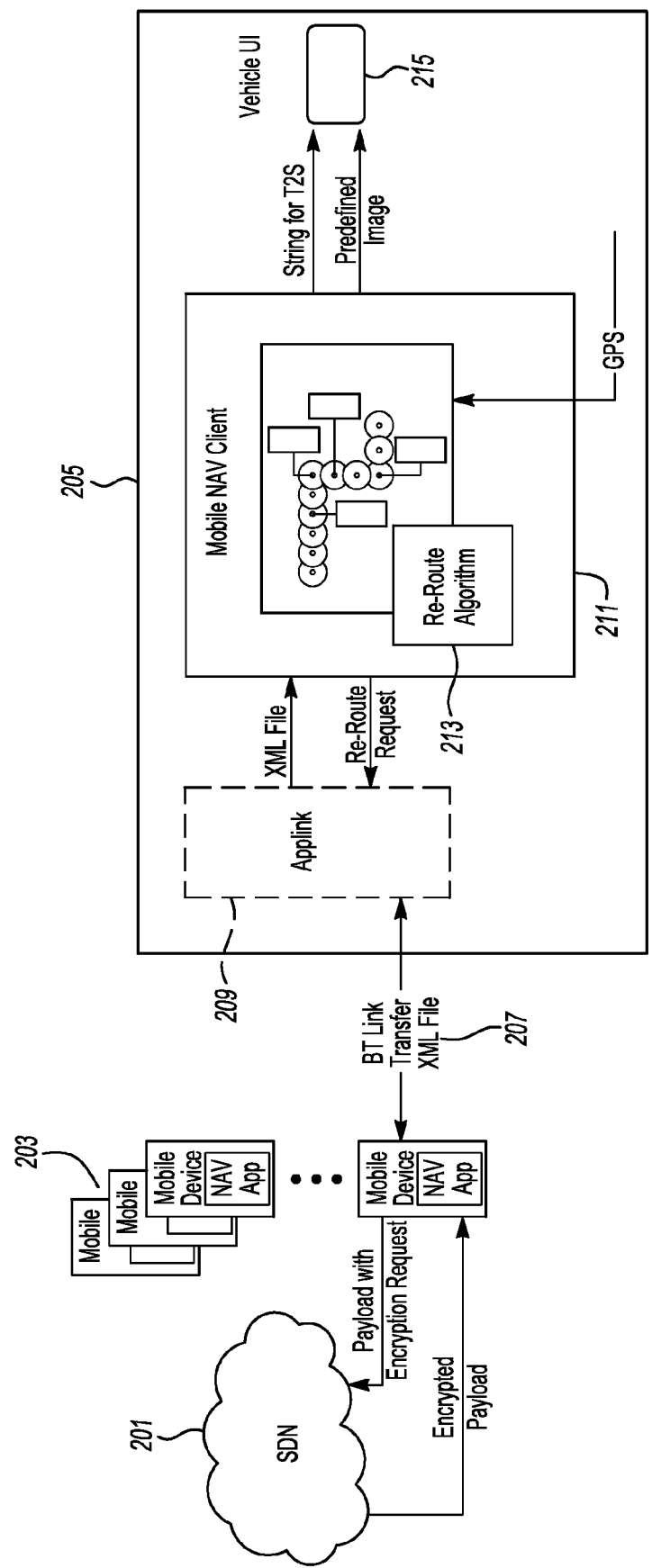
FIG. 2 shows an illustrative example of a mobile and vehicular communication system.

FIG. 2 shows an illustrative example of a mobile and vehicular communication system. In this exemplary system, a vehicle computing system 205 is capable of wireless communication with a wireless device 203 or a plurality of wireless devices. The communication, in this instance, is provided via BLUETOOTH connection 207. Connection is further established between the vehicle computing system and a remote server, such as a cloud based system 201. The server can provide computing power and resource obtainment far beyond the capabilities of a less costly vehicle computing system.

In this example, a mobile device runs a navigation application of a user's choosing. The application is capable of obtaining coordinates, providing directions, etc. Due to the nature of applications, however, output from the application may vary over different mobile applications. In the illustrative embodiments, data output from various mobile applications can be standardized into a format recognizable by a vehicle computing system.

In the illustrative system shown, a navigation application running on a mobile device sends data to a VCS, which, in this instance, runs a mobile application client 211. The data, in this case, is initially handled by an API 209. If the mobile application client receives data that it cannot process, or which is not formatted correctly, the process may re-route the data 213.

Once the data is re-routed, the process can send the data to a mobile device, which can then pass the data along to a cloud-based application 201 or other remote processing application. The remote application can take a stream of incoming data, which can be in the form output by the mobile application, and process the data into a standardized stream recognizable and processable by a vehicle computing system.

Once translated, the cloud based system can send the data back to the vehicle computing system for processing. In this example, the data is relayed through, for example, the same device on which the running application originally produced the navigation data. The data is returned to the vehicle computing system, where it can be process and output to one or more vehicle outputs 215.

Figure 3:
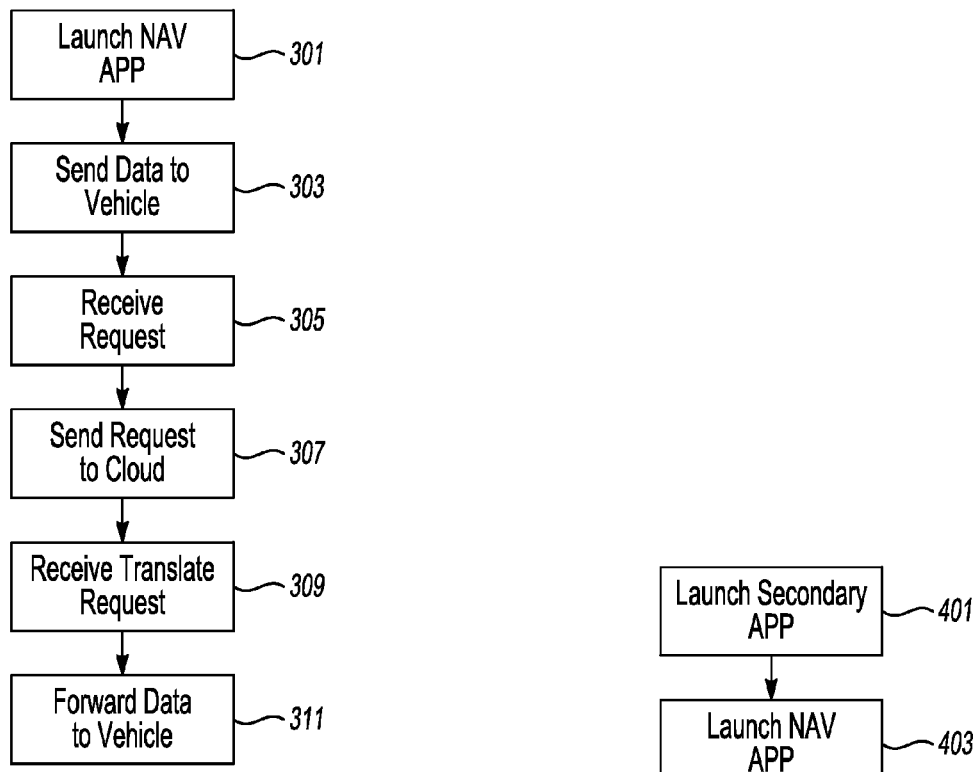
FIG. 3 shows an illustrative example of a navigation data handling process.

FIG. 3 shows an illustrative example of a navigation data handling process. In this illustrative example, the exemplary process is running on a mobile device in wireless communication with a vehicle computing system. A navigation application running on the mobile device is first launched 301. The application can then proceed to determine a route, along with navigation data, and send the output data to a vehicle computing system 303.

As previously noted, the number of navigation applications, the type of platforms on which they run, and the devices which run the applications may vary greatly, and may provide a problematic situation if a vehicle OEM wants to allow a user to playback nav data in a vehicle. Unless all the developers of applications adopt a common output format and strategy (which is unlikely), there will be at least some variances in output that an OEM should account for if interface with all applications is desired.

In this example, data, presumably in a non-standardized form, is sent to the vehicle computing system 303. The vehicle computing system will then reroute the data back to the mobile device 305, for further routing to, in this case, a cloud based application 307. On the cloud, one or more processes are capable of interpreting various nav data outputs and standardizing the data for input to a vehicle computing system. Because the cloud computing is capable of much more powerful computing than a typical vehicle computing system, processing the translation in the cloud can be done much more efficiently.

Once the data has been properly translated by the appropriate remote application, in this embodiment an application residing remotely from both the vehicle and wireless device, the data is sent back to the mobile device 309. Again, this is not a stopping point for the data, but rather the device will then further relay the translated data to a vehicle computing system 311. At this point, the data has been standardized and organized for use by the vehicle computing system, and will presumably be accepted and output to a user as appropriate.

Figure 4:
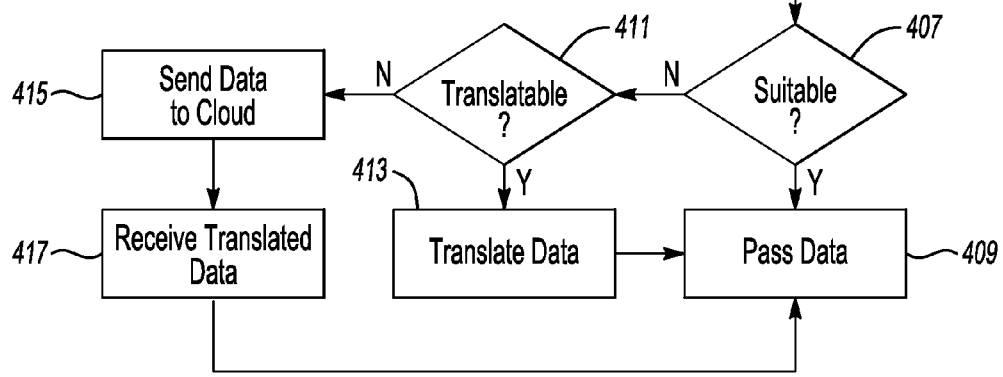
FIG. 4 shows an illustrative example of a second navigation data handling process.

FIG. 4 shows an illustrative example of a second navigation data handling process. In this illustrative example a secondary application is running on the mobile device. In this example, the secondary application handles some translation, transfer decisions and data moving. As seen in the previous example, this can also be handled by a vehicle computing system working in conjunction with a mobile device, or in any suitable manner.

In this illustrative example, a secondary data handling app is launched 401 in conjunction with a navigation application 403. The navigation application can be any application of a user's choosing that provides nav data, directions, GPS data, etc. The secondary application, in this instance, is provided by or at least specced out by an OEM (and possibly third party developed) and is designed to handle data on behalf of a vehicle computing system.

The secondary application receives data from the navigation application 405, which, in this example, would be the data to be output to a vehicle computing system. In other words, instead of outputting the data to a vehicle computing system, the navigation application outputs data to the data handling application.

First, in this illustrative example, the secondary application checks to see if the data is already in a form suitable for relay to a vehicle computing system 407. For example, although there is a process in place to standardize nav application output, one or more nav application developers may simply elect to adopt an OEM or other common paradigm and output the data in an already suitable format. In such a case, there may be no need to translate and/or reformat the data. Accordingly, if the data is already in an appropriate format, the data is passed to the vehicle computing system navigation application 409.

If the data is not in a proper format, it may also be possible that the data is in a format similar to the proper format, or is otherwise translatable using the secondary application running on the device 411. For example, a developer of the secondary application may consider a few of the most popular navigation application outputs, and put processing in the application to handle the translation of these outputs. This avoids the relay to the cloud, and could result in faster translation of the data. If the data is translatable by the local secondary application 411, the process can translate the data 413 and send the translated data to a vehicle computing system for output 409.

If there is no local translation capability, or if the secondary application is unable to translate the data into the common format for relay, the process can send the data to a cloud based or remote application for translation 415. The translated data can then be returned to the secondary application 417 and relayed to the vehicle computing system for handling.

FIG. 5 shows an illustrative example of a third navigation data handling process. In this illustrative example, a process running on the vehicle computing system is shown. This is a process for data handling similar to that running on the mobile device in FIG. 4. In this example, the process receives navigation data from the application running on the mobile device 501. The data can be in any format, and is not necessarily designed for interface/optimization with a vehicle computing system.

If the data has been pre-formatted appropriately by the navigation application, or if the translation has already been completed on the data, the process can recognize that the data is in an acceptable format 503 and process the data for output to a user 505. If the data needs to be processed, however, the process can package the incoming data for relay to a remote translation process 507. Once the data is set for relay, and any additional information is included with the translation request, a request can be sent to the server 509.

Because different vehicles have different available outputs, software builds, computers, etc. installed therein, it may be the case that certain vehicles want the data in a format different from other vehicles with differing capabilities. In this example, the request to the server can include information relating to a vehicle (make/model, software version, outputs, schema request, VIN information, etc.). This can help a remote application decide on a translation format.

Additionally, there may be subscriber based services related to one or more vehicles that are available for subscription to a user. For example, a navigation application on a phone may provide navigation data, but not traffic data. But, a user may be able to subscribe to OEM traffic data, or exchange receipt of advertisements for addition of traffic data. In such an instance, VIN information may be useful to identify the services available to a user. The data can be sent to a remote server for translation, and the additional data (traffic, ads, etc.) can be added in to the formatted data for return to the vehicle.

Once any remote processing has completed on the data, the data may be passed back to the vehicle computing system. The response is received 511, and the process checks to see if the data is in a proper format 513. If the data is still not in a proper format, the process may report an error to a driver 515, since the translation has already been performed. If the data is appropriately translated and formatted correctly, the process can then send the data to the appropriate function for handling 505. As noted, the handling can include the display of traffic information, advertisements, translated navigation data, etc.

FIG. 6 shows an illustrative example of yet another navigation data handling process. This illustrative example shows an example of a translation process. Exemplary formatting of data will also be shown, although this is understood to be for illustrative purposes only, and not intended to limit the scope of the invention, in the same manner that exemplary and illustrative embodiments are not intended to limit the scope of the invention.

In this illustrative embodiment, the translation process runs on a remote server, but it could also be run on any suitable computing system. The process receives navigation data, which includes a request for translation of the data 601. First, the process checks to see if the navigation data is in a format recognizable by the translation process 603. If the data is unrecognizable, the process may return an error message, indicating that translation may not be possible.

If the data is recognizable by the translation process, the process may begin translating and organizing elements of the data. In this example, the process examines the coordinate data included with the navigation data. This data can relate to, for example, current location data, turn points, end point data, etc.

In one non-limiting example, GPS data is put into an XML format as follows:
<Points>
<Point sequence="0" latitude="47.645779" longitude="-122.201759"/>
<Point sequence="1" latitude="48.645779" longitude="-122.201759"/>
<Point sequence="2" latitude="49.645779" longitude="-122.201759"/>
<Point sequence="3" latitude="50.645779" longitude="-122.201759"/>
<Point sequence="4" latitude="51.645779" longitude="-122.201759"/>

Similarly, audio may be processed 509 and placed into an XML format as follows:
<Audio>
<At Maneuver sequence="0" audio "Text2Speech string_1">
<At Maneuver sequence="1" audio "Text2Speech string_2">
<At Maneuver sequence="2" audio "Text2Speech string_3">
<At Maneuver sequence="3" audio "Text2Speech string_4">

Also, any display information may be processed 511 as follows, for example:
<Display>
<At Maneuver sequence="0" display="pre-determined image_a" Parameter 1=X, Parameter 1=Y>
<At Maneuver sequence="0" display="Text-String_1" Parameter 1=B, Parameter 1=A>
<At Maneuver sequence="1" display="pre-determined image_b" Parameter 1=X, Parameter 1=Y>
<At Maneuver sequence="0" display="Text-String_1" Parameter 1=B, Parameter 1=A>
<At Maneuver sequence="0" display="pre-determined image_d" Parameter 1=X, Parameter 1=Y>

From the above, it can be seen that whether there is audio, graphic display, coordinate data, etc. associated with navigation application output, the translation application can standardized this data, format it in a common format, and pass the data back to a vehicle computing system for processing. For example, in the non-limiting example shown above, there are five navigation points at which an event might happen. These events can be graphical, audio, etc., and may correspond, for example, to turn instructions, exit instructions, warning, lane changes, etc.

In this example, at point "0", a speech string is set to be played, and both an image and a text string are set to be played. Then, at point "1", a new string is played and a new image is displayed. Data formatted in this manner helps ensure that the data is passed to a vehicle computing system in a manner recognizable by the vehicle computing system. This assists in processing the data and helps ensure that all data is output to the driver.

Once the data has been translated and formatted, the remote process can package the data for return to the vehicle computing system 613 and send the data back to the mobile device 615. From there, the data can be sent along to the vehicle computing system for processing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a processor configured to communicate wirelessly with a mobile device, wherein the processor is further configured to
   receive output data from a navigation application running on the mobile device,
   send data back through the mobile device to a standardization system, including a request for standardization, running on a remote system, if the output data is in an unusable format,
   receive a standardized form of the data, having been standardized by the remote standardization system, and
   process the standardized data to provide navigation directions through one or more vehicle outputs controllable by the processor.

2. The system of claim 1, wherein the standardization system runs on the mobile device.

3. The system of claim 1, wherein the standardization system runs on a processor remote from the vehicle.

4. The system of claim 1, wherein the request for standardization includes vehicle information.

5. The system of claim 4, wherein the vehicle information includes vehicle operating system information.

6. The system of claim 4, wherein the vehicle information includes a VIN.

7. The system of claim 4, wherein the vehicle information includes user account information.

8. The system of claim 1, wherein the processor is further configured to determine if the unusable format of data is locally standardizable, using a routine available to be run by the processor, and wherein the processor is further configured to access the local routine to standardize the data if the data is locally standardizable.

9. A system comprising:
   a mobile device, in communication with a processor and configured to run a plurality of applications, wherein running of a data handling application results in the mobile device being configured to
   receive output data from a navigation application, also running on the mobile device,
   determine if the output data is in a usable format,
   send usable data to a vehicle computing system in wireless communication with the mobile device, including a request for the vehicle to output the usable data in the form of navigation instructions,
   standardize unusable data if the data is standardizable by a local process executable by the mobile device,
   send data that is unusable and not locally standardizable to a remote server for standardization,
   receive data, having been standardized by the remote server, and
   relay the standardized data to the vehicle computing system, including a request for the vehicle to output the usable data in the form of navigation instructions.

10. The system of claim 9, wherein the mobile device's determination whether the data is in a usable format includes the device being configured to send data to the vehicle computing system including a request for response on the usability of the data.

11. The system of claim 10, wherein the mobile device's determination whether the data is in a usable format includes the device being configured to receive a response from the vehicle computing system including an indication of the usability of the data.

12. The system of claim 9, wherein the mobile device is further configured to query the vehicle computing system for system information.

13. The system of claim 12, wherein the query includes a query as to a VIN.

14. The system of claim 12, wherein the query includes a query as to operating system information.

15. The system of claim 12, wherein the query includes a query as to user account information.

16. The system of claim 9, wherein the mobile device is further configured to include system information retrieved as a result of the query with the data sent to the remote server.

17. The system of claim 9, wherein the mobile device is further configured to vary the standardization of data based at least in part on system information retrieved as a result of the query with the data sent to the remote server.

18. A system comprising:
   a processor configured to wirelessly communicate with a mobile device, wherein the processor is further configured to
   receive incoming navigation data from an application running on the mobile device,
   send the data back through the mobile device to a remote server including a request for data standardization;
   receive the data, having been standardized by the server as per the request; and
   process the reconfigured data to provide navigation instructions to a driver.

19. The system of claim 18, wherein the data standardization includes translation of the data format.

20. The system of claim 18, wherein the processor is configured to include one or more pieces of vehicle information with the data sent back to the remote server.

* * * * *